INVENTOR.
Albert S. Crandon, Jr.
BY Webb, Mackey & Burden
HIS ATTORNEYS

United States Patent Office

2,928,213
Patented Mar. 15, 1960

2,928,213

MANUFACTURE OF SHEET GLASS

Albert S. Crandon, Jr., Pittsburgh, Pa., assignor to American Window Glass Company, Pittsburgh, Pa., a corporation of Pennsylvania Application August 8, 1957, Serial No. 676,969

10 Claims. (Cl. 49—17)

This invention relates to the manufacture of sheet glass and to the annealing and cooling thereof as the sheet is substantially continuously drawn from a molten bath of glass. More particularly, it relates to improved apparatus for controlling air circulation adjacent the sheet whereby eddy currens and rising columns of turbulent air are minimized in the immediate vicinity of the sheet being annealed and cooled.

In the Fourcault process of manufacturing sheet glass, the molten glass in the pit is caused to flow or well upwardly through a slot in a debiteuse. It is passed between coolers within the drawing pit or chamber and is stretched and set and thereafter carried upwardly through a vertically extending annealing and cooling lehr which houses part of the drawing mechanism. Adjacent the top of the lehr the continuously rising glass sheet is scored and cut into desired lengths.

The zones through which the sheet successively passes are in atmospheric communication and the heat from the drawing pit and that given off by the cooling of the glass as it moves upwardly through the various zones produces uncontrolled currents of air which flow from the stretching and setting zone in the direction of travel of the sheet and, consequently, currents of colder air and stray gases are inducted thereby causing turbulence and unequalized heat during stretching, setting, annealing and cooling which results in nonuniform cooling of the glass. Similar difficulties are encountered in other drawing processes in which the sheet is drawn vertically from the bath of molten glass and then passes through a horizontally extending lehr.

In accordance with a known manufacturing practice, cross currents of forced air are provided to interrupt the foregoing chimney effect, but where any substantial amount of the gas being transversely circulated is not carried from one edge of the sheet being drawn to at least the other edge and where it instead passes vertically along the sheet, there is a substantial tendency for it to rise with the sheet and create heat waves leading to distortion in the finished product. The air currents or heat waves themselves are also conducive to instability of air pressure in the direction of the width of the sheet and, therefore, secondary eddy currents or turbulence tend to develop along the opposite faces of the glass. If the forced air flow is not of a uniform character substantially eliminating all turbulence, the resulting product will have waves or batter, both of which produce distortion of light passing through the finished product.

The present invention largely eliminates the foregoing irregularities by providing forced transverse flow of air in the drawing machine proper at each zone or level between successive drawing rolls, the flow at these levels being from each edge to the opposite edge and in mutually opposite directions from standpoint of the opposite faces of the rising sheet so as to constantly recirculate air in a path closing on itself. I also provide means to augment the ambient air by introducing cooling air which is injected at each of several levels and in a well blended fashion into the peripheral portions of circulation with concurrent flow so as to mix without leaving pronounced hot or cold streaks. The result is a fairly high but equalized temperature condition in the gas surrounding the sheet with a consequently stable atmospheric pressure and equalized transfer of heat from the glass to that gas. I am thus able to reduce and spread out the initial permanent strain as the glass sets and can accordingly provide improved annealing and cooling and relatively fast drawing speeds without excessive breakage in the machine or attendant breakage of the sheets in the storage rack.

More specifically, I provide in the opposite ends of each zone and disposed so as to extend transversely from one of the side walls to the other one, a pair of return bend members consisting of U-shaped lengths of sheet metal pipe or in another example, generally semi-cylindrical shapes of metal plate and in the pipes I provide a self-contained air impeller adjacent the return bend therein which draws a current of air through one leg of the U-shape and impinges that air through the other leg to steadily contact the adjacent face of the sheet. The end of each plate or leg terminates alongside the adjacent side wall at a point substantially transversely aligned with but laterally offset from the adjacent edge of the sheet at that side.

From their positions located within the return bend members at opposite ends of each zone as indicated, I cause rotation of the air impellers, fanning the air to make the return bend members operate in tandem in forcing circulation through each zone and I effectively insulate the drive means necessary for those impellers by locating impeller drive motors remote to the lehr and by providing a long drive shaft connection leading therefrom to the different impellers and thus avoid exposure of the motors to direct conductance of the lehr heat. The injected air is carried in parallel headers which I provide, and which is delivered thereby from a line of spaced nozzles having right angled bends therein for discharging in the proper direction.

It is highly desirable to maintain uniformity of cooling and this cooling may be readily obtained by the apparatus above described. The effect of injecting cooling air is to reduce to the proper temperature the surrounding gaseous medium which is in constant transverse circulation around and in continuous contact with the rising glass sheet. This circulation tends to equalize as well as reduce temperature conditions across the sheet and, in what is probably of greater importance, it materially smooths the temperature curve across the sheet in each of the respective zones and removes any irregularities therefrom.

Further features, objects and advantages will either be specifically pointed out or become apparent from the following description taken in conjunction with the accompanying drawings which show preferred embodiments of my invention. In the drawings.

Figure 1:
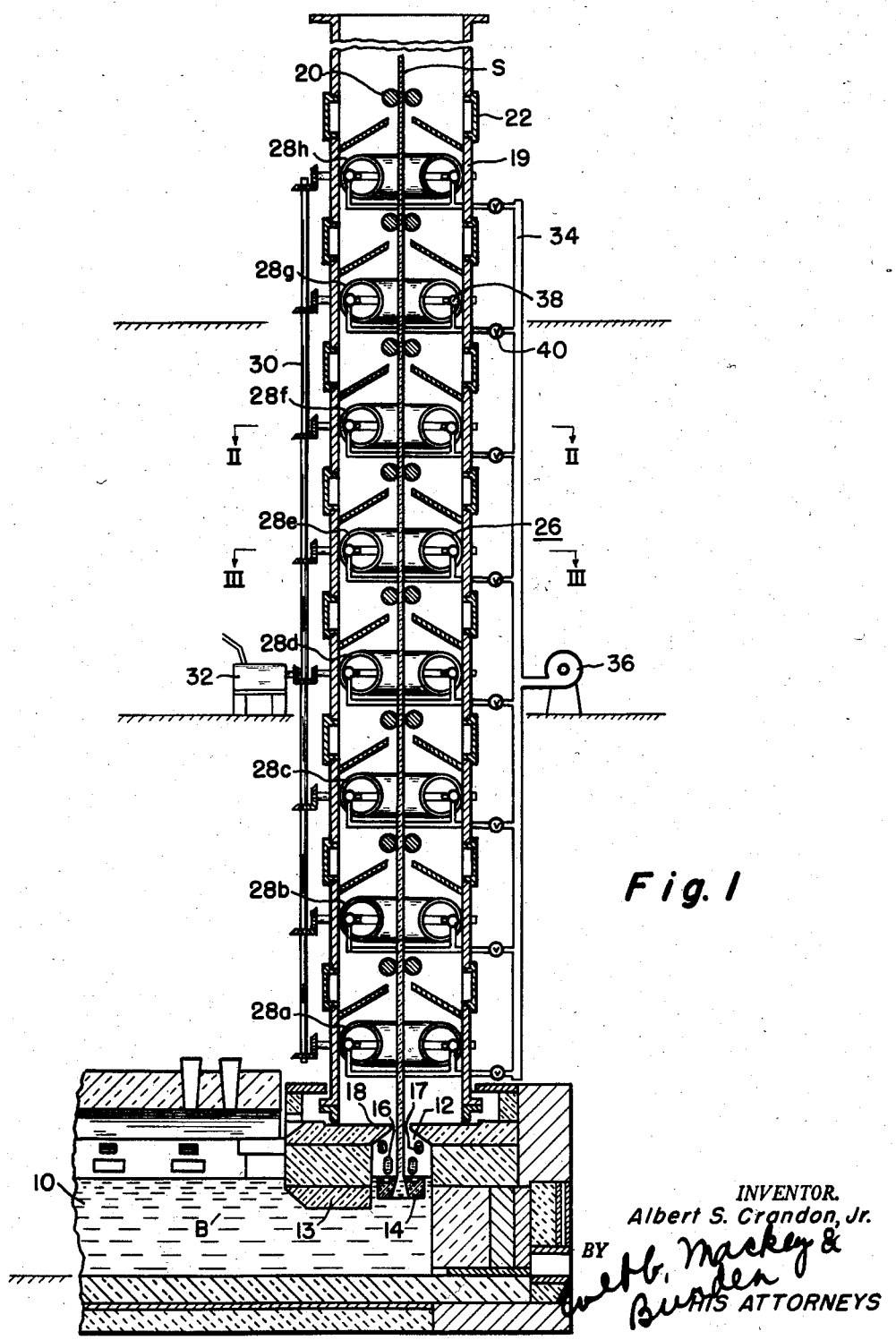
Figure 1 is a vertical sectional view through the tank and lehr of a glass drawing apparatus embodying my invention.

In the drawings molten glass in a bath B is fed from a canal 10 to a drawing chamber or pit 12, the drawing pit being separated from the canal by means of a bridge wall 13. A floating debiteuse block 14 has a longitudinally extending drawing slot and is positioned and held partially submerged in the glass bath B by appropriate presser bars (not shown) which cooperate with the four corners of the block. Glass wells upwardly through the slot in the debiteuse block 14 and is initially started vertically in the pit by means of a bait. The resulting glass sheet which is indicated at S is drawn upwardly through the drawing pit 12 between a pair of longitudinally extending main water coolers 16 and further auxiliary coolers 17, if desired, which are positioned adjacent opposite faces of the rising sheet. It then passes vertically between a pair of nose blocks 18 and into the base of the drawing machine proper or lehr 19. The coolers 16 and 17 are hollow and water is circulated therethrough for cooling and solidifying the sheet S. The lehr 19 is an annealing and cooling lehr and is provided with a plurality of roll sets of which eight are shown at eight different levels, each consisting of a pair of glass carrying rolls 20 with the lehr being of sufficient length to permit further cooling and annealing of the glass sheet being drawn to a point where it can be manually or otherwise handled. At the top of the lehr 19 the rising sheet or ribbon is separated into individual sheets and the sheets are removed to a cutting room for cutting into smaller sizes.

It is desirable that there be no uncontrolled gaseous movement immediately adjacent the glass sheet in the drawing pit. I, therefore, prefer that the pit be kept as tightly closed as practicable during operations in order to materially reduce air infiltration and accommodate only controlled movement of the pit gases without appreciable dilution. Actual circulatory means, which is omitted from the drawings for the sake of clarity, may be provided in the pit. I also prefer that all doors, indicated at 22 in the drawing machine proper, remain closed at least up to above the eighth set of rolls 20.

Beginning at the level between the nose blocks 18 and the lowermost set of rolls 20 and continuing with each successive level or zone thereafter, I provide ducts and fans generally indicated at 26 and each consisting of pairs 28 of members having a common vertical line shaft 30 for driving the fans, the shaft being rotated by means of a common air motor 32. One member of each of the eight pairs is shown in Figure 1, being indicated in ascending order by the respective reference numerals 28a through 28h inclusive. A vertically extending riser or duct 34 carries cooling air under pressure from a common compressed air source or atmosphere-connected blower 36, as shown, to eight different pairs of injection headers 38, each pair being provided for a different zone or level in the lehr. The headers have an individual control valve 40 connecting each pair to the common air duct 34 for individual control of injected air.

Figure 2:
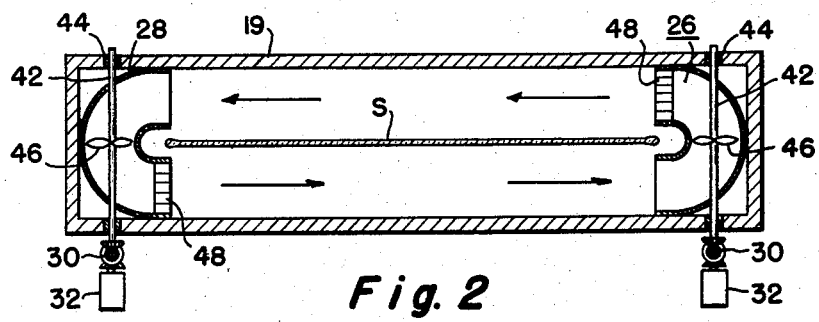
Figure 2 is a sectional view taken along the lines II—II of Figure 1 with the showing of Figure 3 removed.

As more particularly shown in Figure 2, in which the members 28 conform to a general U-shape, they are located by pairs in opposite ends of each zone of the lehr 19 and consists of coplanar return bend pipes having their legs in axial alignment. Two fan shafts 42 are provided at each level or zone, one being positioned at each end of the zone so as to extend transversely thereto and each shaft is set in a pair of coaxial bearings 44 so as to rotate a four-bladed air impeller 46 secured thereto between the bearings. The fan shafts 42 are connected to the different vertical line shafts 30 by means of appropriate bevel gearing. Each member 28 carries baffles 48 at the mouth of the discharge leg thereof and the motors 32 are rotated in a direction to cause enforced circulation conforming to an oblong endless, plane closed figure in the counterclockwise direction around the glass sheet as seen in Figure 2, the gas current emerging from the baffles 48 being separated from the opposite portion of circulating air by means of the intervening sheet S which divides the lehr.

Figure 3:
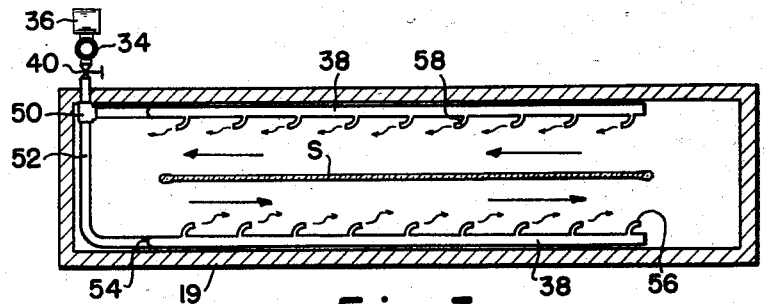
Figure 3 is a section taken along the lines III—III of Figure 1, with the showing of Figure 2 removed for clarity.

As shown in Figure 3, the riser 34 for the injected air is connected through a set of valves 40 individual to each pair of headers 38 and thence by means of a T connection 50 which feeds into and forms an inner joint for a generally U-shaped supply conduit 52. The ends of the legs of the supply conduit 52 are level and are connected through short vertical risers 54 to the headers 38 which extend horizontally in a vertically offset position. Cooling air from the headers 38 is discharged in the same direction of circulation as that produced by the impellers 46 by means of a 90° injection nozzles 56 and 58 which disperse the air in the peripheral portions of the circulating current and in the plane thereof. Nine of the nozzles 56 are shown for illustrative purposes and also nine of the oppositely directed nozzles 58 are shown, being arranged at a spaced line of points coplanar with the air circulation so as to introduce the augmenting air in opposite directions with respect to the opposite faces of the sheet S. This cooling gas not only serves the primary purpose of reducing the temperature of the glass but creates a strong tendency to equalize the temperature conditions across the sheet. The equalizing effect seems to be due not merely to transverse flow of the gaseous medium but also to a reduction in the natural stack effect of the vertically extending lehr. The introduction of air or gas under positive pressure changes the normal stack effect and also reduces to some degree, if not entirely, the infiltration of stray currents of cold air.

Figure 4:
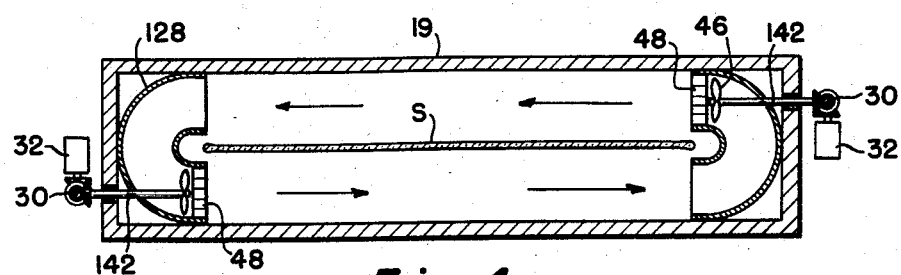
Figure 4 is a modification of the embodiment of Figure 2, the showing of Figure 3 likewise being omitted from Figure 4; and, Figure 5 is a further modification.

In the embodiment shown in Figure 4, the return bend members 128 are U-shaped and are arranged in a manner similar to those shown in Figure 2. They include baffles 48, but, in this example, the air motors 32 are connected through the vertical line shafts 30 to drive a pair of longitudinally extending fan shafts 142 which are offset both laterally and longitudinally from opposite sides of the sheet S. Thus the air impellers 46 connected to those shafts have a plane of rotation perpendicular to the plane of the sheet S and are offset laterally therefrom so as to discharge directly in the plane of the baffles 48.

Figure 5:
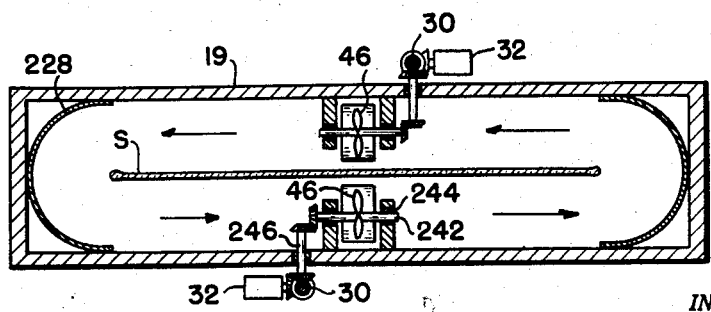

In the modification of Figure 5, the return bend members 228 consist of semi-cylindrical shapes of wide strip metal which turn the air so as to reverse it at the ends of the sheet S. Thus the sheet S at all points forms a bisecting partition longitudinally separating the portions of the circulating air current and the circulation is created by air impellers 46 which, in this example, are mounted at midpoints on fan shafts 242. The shafts 242 are stub shafts set in end bearings 244 parallel to the sheet S and are driven by individual cross shafts 246 which are connected by bevel gearing to the two common motor driven line shafts 30.

From the operation of the foregoing controlled air circulation means it will be seen that by promoting the equalization or uniformity of temperature transversely of the glass sheet across both sides thereof, equal transfer of heat from the glass to the surrounding atmosphere occurs, resulting in more uniform annealing and cooling. The speed of the circulatory currents not only aids the heat transfer but also breaks up the unpredictable and variable convection currents which have heretofore unbalanced the rate of heat transfer from the glass sheet and have thus fostered unequal annealing and cooling.

It is apparent that by providing control over the cooling air input at a plurality of levels, the atmospheric temperatures and hence, relative glass temperatures are forced into the more desirable theoretical cooling curve for proper annealing and cooling. Faster drawing speeds can, therefore, be achieved as a result of the better annealing and cooling obtained.

The speed of the air motors 32 relative to one another is adjusted to insure a balanced load sharing relationship between the return bend members as they operate in tandem on the common current of air. Thus my system provides uniformly distributed air pressure without unnecessary complications due to air valves, and without excessive pressure build-up on either side of the glass sheet. It also provides equal transfer of heat from the glass to the surrounding atmosphere. By this statement, I do not mean to imply that the temperature at various points on the sheet are necessarily equal. The temperatures of the edges of the rising sheet may be somewhat lower than those prevailing intermediate the edges. When stating that the temperatures are rendered uniform, I mean that the temperature gradient or curve from the center to each edge is substantially uniform in comparison to former processes where the temperature gradient fluctuates materially. Also, the temperature curves lengthwise of the sheet are appreciably smoothed.

Variations within the spirit and scope of the invention described are equally comprehended by the foregoing description.

I claim:

1. Glass drawing apparatus with side and end walls forming a setting and annealing chamber for use with a source of molten glass, comprising means including glass drawing rolls for substantially continuously drawing through said chamber a sheet of glass from said source, air return members occupying a common level in a zone through which the rising sheet passes and extending from one side wall to the other in a disposition one at each edge of the sheet being drawn for defining an air path turning around that edge, and a plurality of impellers rotatable in said zone to move a current of air flowing in opposite directions across the faces of the sheet through the path defined so as to close on itself, said sheet forming an intervening partition cooperating with said side walls for physically dividing oppositely flowing portions of the air current from one another at substantially all points in their path.

2. Glass drawing apparatus according to claim 1 wherein said air return members each comprises a U-shaped pipe open at both ends and shrouding one impeller, said sheet forming an intervening partition physically dividing the oppositely flowing portions of air current from one another at all intervening points between the defined paths through said pipes.

3. Glass drawing apparatus with side and end walls forming a setting and annealing chamber for use with a source of molten glass, comprising means including glass drawing rolls for substantially continuously drawing through said chamber a sheet of glass from said source, air return members occupying a common level in a zone through which the rising sheet passes and extending from one side wall to the other in a disposition one at each edge of the sheet being drawn for defining an air path turning around that edge, a plurality of impellers rotatable in said zone to move a current of ambient air for flowing in opposite directions across the faces of the sheet through a path defined so as to close on itself, and a plurality of air fed nozzles in said zone directed to inject cooling air into the ambient air current.

4. Glass drawing apparatus with side and end walls forming a setting and annealing chamber for use with a source of molten glass, comprising means including glass drawing rolls for substantially continuously drawing a sheet of glass from said source, air return members occupying a common level in a zone through which the rising sheet passes and extending from one side wall to the other in a disposition one at each edge of the sheet being drawn for defining an air path turning around that edge, said sheet in the direction of its width forming an intervening partition longitudinally bisecting said zone, and a plurality of impellers offset from the plane of said sheet in said zone and rotatable to direct a current of air endlessly in opposite directions across the face of the sheet and through the return paths in a defined oblong circuit so as to close on itself.

5. Glass drawing apparatus with side and end walls forming a setting and annealing chamber for use with a source of molten glass, comprising means including glass drawing rolls for substantially continuously drawing a sheet of glass from said source, air return members occupying a common level in a zone through which the rising sheet passes and extending from one side wall to the other in a disposition one at each edge of the sheet being drawn for defining an air path turning around that edge, said sheet in the direction of its width forming an intervening partition longitudinally bisecting said zone, and a pair of transversely aligned impellers in said zone and rotatable to move a current of air for flowing in opposite directions across the faces of the sheet through the paths defined so as to close on itself.

6. Glass drawing apparatus for use with a source of roll-drawn molten glass, comprising elongated means in which a sheet of glass extends in being drawn from said source, said glass sheet adapted to be substantially continuously moved upwardly by the rolls through different zones therein, return bend means individual to said zones and defining a transverse path around the glass sheet at its opposite edges, means of circulation individual to said zones and each operable to direct air in opposite directions across opposite faces of said sheet and leading in a path through said return bend means and closing on itself in that zone, energy supplying means, and vertically extending means common to the means of circulation in said zones for effecting operation thereof and coupled to said energy supplying means.

7. Apparatus according to claim 6 wherein a mechanical fan system including pairs of companion impellers constitutes said means of circulation, said vertically extending means comprising a line shaft common to one impeller of each pair, and another line shaft common to the other impellers for rotating the same to circulate the air in said zones, said energy supplying means comprising adjustable speed power means connected to rotate said shafts at speeds adjusted so that they share the load of circulation throughout said elongated means.

8. Glass drawing apparatus for use with a source of roll-drawn molten glass, comprising elongated means in which a sheet of glass extends in being drawn from said source, said glass sheet adapted to be substantially continuously moved upwardly therethrough by spaced sets of the drawing rolls, fans interposed at a plurality of the levels between successive sets of the drawing rolls to circulate air, power means common to a plurality of said fans to drive them in unison, and air path means formed in part by spaced return bend members and in part by an intervening portion of the sheet itself for conducting air from the fans at each level in a path closing on itself transversely about that portion of the sheet.

9. Glass drawing apparatus for use with a source of roll-drawn molten glass, comprising elongated means in which a sheet of glass extends in being drawn from said source, said glass sheet adapted to be substantially continuously moved upwardly therethrough by spaced sets of the drawing rolls, fans interposed at a plurality of the levels between successive sets of the drawing rolls to circulate air, power means common to a plurality of said fans to drive them in unison, and air path means formed in part by spaced return bend members shrouding the fans and in part by the sheet itself for conducting air at each level in a path closing on itself transversely about the sheet.

10. Glass drawing apparatus for use with a source of roll-drawn molten glass, comprising elongated means in which a sheet of glass extends in being drawn from said source, said glass sheet adapted to be substantially continuously moved upwardly therethrough by spaced sets of the drawing rolls, means including return bend members and sets of baffles cooperating to direct air in paths at individual levels between the successive sets of rolls with each path conforming to and closing on itself in a direction across the width of the sheet of glass being drawn, fan shafts adjacent the baffles at each level and extending in a direction parallel to but offset from the plane of the sheet, and fans connected to different ones of said fan shafts to discharge in the plane of an adjacent set of baffles.

References Cited in the file of this patent

UNITED STATES PATENTS

| | | |
|---|---|---|
| 1,999,588 | Fox et al. | Apr. 30, 1935 |
| 2,116,693 | Bishop | May 10, 1938 |
| 2,158,669 | Amsler | May 16, 1939 |
| 2,287,136 | Rolland et al. | June 23, 1942 |
| 2,458,040 | Weller | Jan. 4, 1949 |
| 2,519,457 | Halbach et al. | Aug. 22, 1950 |

FOREIGN PATENTS

| | | |
|---|---|---|
| 102,275 | Australia | Oct. 15, 1937 |